United States Patent [19]

Ishii

[11] Patent Number: 4,860,153
[45] Date of Patent: Aug. 22, 1989

[54] CURRENT SENSING DEVICE

[75] Inventor: Kazuhiro Ishii, Fukuyama, Japan

[73] Assignee: Mitsubishi Denki Kabushiki Kaisha, Tokyo, Japan

[21] Appl. No.: 187,561

[22] Filed: Apr. 28, 1988

[30] Foreign Application Priority Data

Apr. 30, 1987 [JP] Japan .................................. 62-109331
May 29, 1987 [JP] Japan .................................. 62-136696

[51] Int. Cl.$^4$ ............................................... H02H 3/08
[52] U.S. Cl. ........................................ 361/94; 361/92; 361/93
[58] Field of Search ....................... 361/87, 86, 93, 92, 361/94; 240/662, 663

[56] References Cited

U.S. PATENT DOCUMENTS

| 4,279,007 | 7/1981 | Shimp | 361/93 |
| 4,297,741 | 10/1981 | Howell | 361/93 |
| 4,379,317 | 4/1983 | Conroy, Jr. et al. | 361/92 |
| 4,550,360 | 10/1985 | Dougherty | 361/93 |

Primary Examiner—Derek S. Jennings
Attorney, Agent, or Firm—Oblon, Spivak, McClelland, Maier & Neustadt

[57] ABSTRACT

A current sensing device comprises a constant d.c. voltage power supply circuit which is fed with a current flowing in one direction and outputs a positive potential, a medium potential and a negative potential at a positive output terminal, a medium output terminal and a negative output terminal, respectively a current sensing resistive element connected in series to the power circuit a differential amplifier circuit which is fed with power from the output of the power supply circuit, and converts the voltage drop across the current sensing resistive element proportional to the one-direction current into an output signal based on the medium potential between the positive potential and the negative potential of the outputs a switching circuit; a control circuit which is fed with power from the power supply circuit and receives the output signal of the differential amplifier circuit proportional to the one-direction current to control the closing operation of the switching circuit signaling device which is activated by the closure of the switching circuit to emit light or produce a warning sound; and a switching operation prohibitive circuit which is connected to prevent the switching circuit from being closed improperly when the output voltage of the power supply circuit is not enough to operate the differential amplifier or the control circuit properly.

5 Claims, 8 Drawing Sheets

CURRENT SENSING DEVICE

The present invention relates to a current sensing device for detecting an electric current which flows through an a.c. line or a d.c. line, and a current sensing device suitably used in a circuit breaker with an overcurrent trip device.

There have been known such type of current sensing devices, wherein an a.c. current flowing through a line causes an output current to be induced in the secondary winding of a current transformer, with a predetermined current ratio. The output current from the transformer is rectified by a full-wave rectification circuit and is fed to a shunt circuit. The waveform of a signal voltage in the shunt circuit changes only in one direction and is converted into a signal corresponding to its effective value or mean value, by a signal conversion circuit in the next step.

The output signal from the signal conversion circuit is fed to a fault judgement cuicuit. When the fault judgement circuit determines that the sensed current value is above a predetermined level, it activates a signaling means based on the level detection signal to light a lamp or sound an alarm.

A power supply circuit for the fault judgement circuit is connected in parallel with the shunt circuit.

Since the conventional current sensing devices are constructed as described above, only one part of the secondary current in the current transformer as the current sensing means flows through the power supply circuit. As a result, the current flowing through the shunt circuit does not always correspond to the current flowing through the a.c. line to be detected, which can cause an error in sensing the current level. The current flowing into the power supply circuit is not constant, so it is difficult to correct the error.

In addition, when the load current flowing through the line to be detected is as small as 10% of rated current of the current sensing device, there is a disadvantage in that the current sensing devices sometimes malfunctions, because the output voltage of the power supply circuit is not enough to drive the fault judgement circuit.

These are applicable not only to the case that a current flowing through an a.c. line is detected, but also to the case that a current flowing through a d.c. line is detected.

It is an object of the present invention to eliminate the disadvantage of the conventional current sensing devices and to provide a new and improved current sensing device capable of providing greater accuracy in the level detection of the current, of avoiding the malfunction in sensing the current level when the output voltage of the power supply circuit is not enough, and of signaling the results of the level detection without failure.

It is another object of the present invention to provide a current sensing device suitably used in a circuit breaker, which can provide greater accuracy in fault current level detection precision, and which can prevent the malfunction of a control circuit when the output of the power supply circuit is not enough.

The foregoing objects of the present invention have been attained by providing a current sensing device comprising a constant d.c. voltage power supply circuit which is fed with a current flowing in one direction and which outputs a positive potential, a ground potential and a negative potential at its respective output terminals, a current sensing resistive element connected in series with the power supply circuit, a differential amplifier circuit for amplifying the potential difference across the resistive element, a switching circuit, a control circuit for controlling the switching circuit, a switching operation prohibitive circuit for preventing the switching circuit from being closed when the potential difference across the resistive element is not enough to operate the differential amplifier circuit or the control circuit, and signaling means for signaling that the closing operation of the switching circuit is prohibited.

In a circuit breaker using a current sensing device according to the present invention, the current sensing device is characterized in that the output current of a current transformer for sensing a current through an a.c. line is converted into a current flowing in one direction by a rectifier circuit, a power supply circuit and a current sensing resistive element are connected in series between the outputs of the rectifier circuit, there is provided a differential amplifier circuit for amplifying the potential difference across the resistive element, there is also provided a switching operation prohibitive circuit for preventing a switching circuit from being closed when the potential difference across the resistive element is not enough to operate the differential amplifier circuit and a control circuit for controlling the switching circuit properly, and there is also provided a signaling means for indicating the load current level.

The control circuit can be constituted by a comparator which is fed with power from the power supply circuit and which compares the output voltage of the differential amplifier circuit which is proportional to the one-direction current, with a reference voltage.

The control circuit can be also constituted by a timer circuit which is fed with power supplied from the power supply circuit, which is connected to the differential amplifier circuit so as to receive its output signal which is proportional to the one direction current and provides predetermined time delays so as to correspond to the rate of the one direction current.

This one-direction current flows through the power supply circuit and the current sensing resistive element. In this way, this one-direction current passes through the current sensing resistive element to prevent an error in current detection. This can provide greater accuracy in current level detection.

In addition, the switching operation prohibitive circuit is provided to prevent the control circuit from malfunctioning even if the current flowing through the power supply circuit is too small. The signaling means notifies a user with a warning light or a warning sound that the load current is beyond a predetermined level.

Further object and advantages of the present invention will be apparent from the following description, reference being had to the accompanying drawings wherein preferred embodiments of the present invention are clearly shown.

DETAILED DESCRIPTION OF THE DRAWINGS

Figure 1:
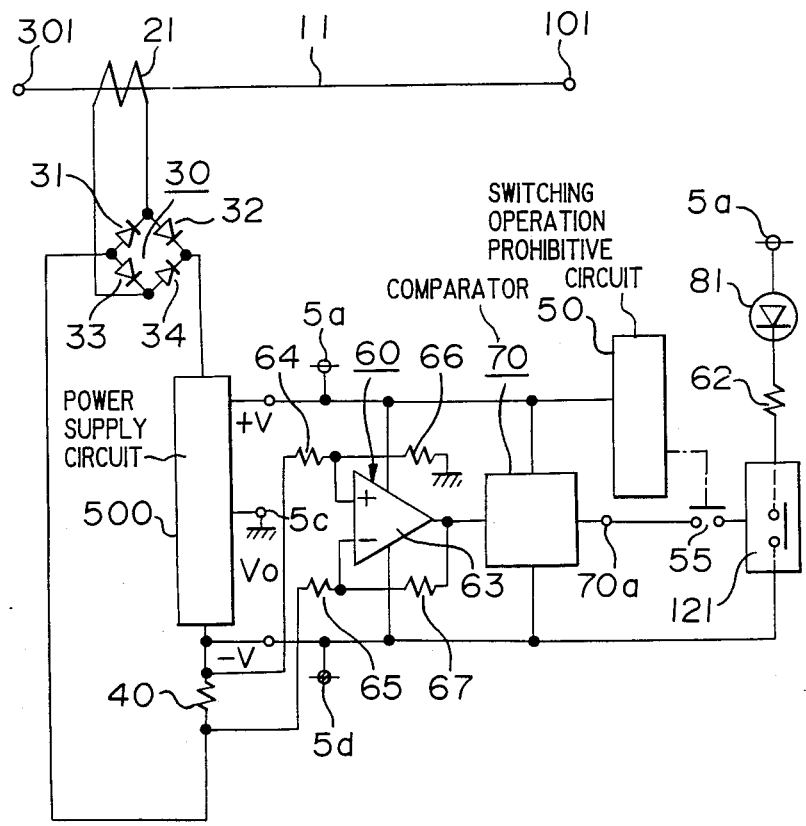
FIG. 1 is a circuit diagram showing an embodiment of the current sensing device according to the present invention.

Referring now to the drawings, wherein like reference numerals designate like or corresponding parts throughout the several views, FIG. 1 is a circuit diagram showing an embodiment of the current sensing device of the present invention.

In FIG. 1, a current transformer 21 for sensing a current to be detected is interposed in an a.c. line 11 between a line terminal 101 and a load terminal 301. Connected to the secondary winding of the current transformer 21 is a bridge rectifier circuit 30 which rectifies the secondary output current. The rectifier circuit 30 is constituted by a parallel combination of a series circuit of diodes 31, 32 and another series circuit of diodes 33, 34.

Connected to the positive output terminal of the rectifier circuit 30 is a constant d.c. voltage power supply circuit 500 which is provided with a positive terminal 5a, a ground terminal 5c and a negative terminal 5d.

Figure 2:
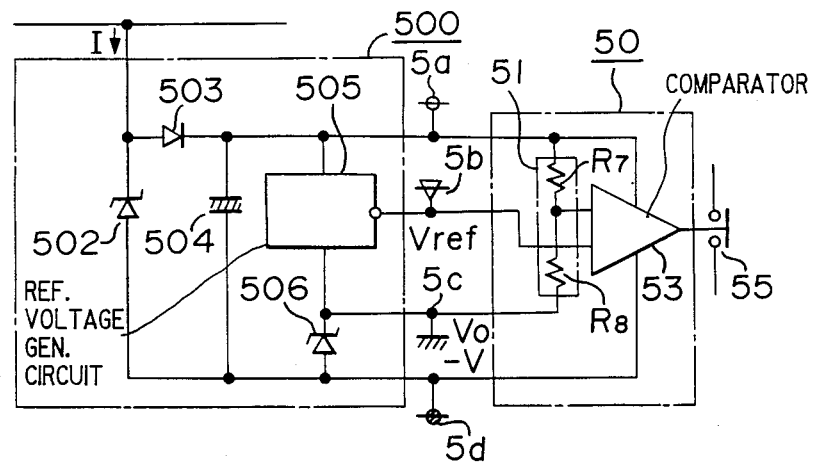
FIG. 2 is a circuit diagram showing an embodiment of the power supply and the switching operation prohibitive circuit according to the present invention.

FIG. 2 is an embodiment of the power supply circuit 500. A voltage limiting element 502 such as a zener diode is connected in parallel with a smoothing capacitor 504 through a diode 503.

A reference voltage generating circuit 505 is connected to the positive potential terminal 5a. A voltage limiting element 506 is connected in series with the reference voltage generating circuit 505. The junction between the voltage limiting element 506 and the reference voltage generating circuit 505 is connected to the medium terminal 5c of the power supply circuit 500. The output terminal of the reference voltage generating circuit 505 is connected to a reference voltage terminal 5b of the power supply circuit 500.

As shown in FIG. 1, a current sensing resistive element 40 has one end connected to the negative terminal 5d of the power supply circuit 500 and the other end connected to the negative output terminal of the rectifier circuit 30. This structure allows full wave recitification current to flow in the sensing resistive element 40 so as to correspond to the load current to be detected.

A differential amplifier circuit 60 is provided to convert the voltage drop across the sensing resistive element 40 into a signal based on the ground potential $V_0$ of the power supply circuit 500. The differential amplifier circuit 60 can comprise an operational amplifier 63 and four resistive elements 64, 65, 66 and 67.

The operating power of the differential amplifier circuit 60 is supplied by the power supply circuit 500. The input terminals of the differential amplifier circuit 60 are connected across the current sensing resistive element 40.

The control circuit is constituted by a comparator 70 as known. It is provided to compare the output voltage of the differential amplifier circuit 60 with the reference voltage. When the output voltage of the differential amplifier circuit exceeds the reference voltage, the comparator outputs an output signal at its output terminal 70a.

A light emitting element 81 is connected to the positive output potential terminal 5a of the power supply circuit 500. A switching circuit 121 has one end connected in series to the light emitting element 81 through a resistive element 62 and the other end connected to the negative output terminal 5d of the power supply circuit 500. The light emitting element 81 is constructed so that it emits light when the switching circuit 121 is closed.

A switching operation prohibitive circuit 50 can be constituted by a comparator 53 and a voltage divider circuit 51 as shown in FIG. 2. The voltage divider circuit 51 can comprise resistive elements $R_7$ and $R_8$. The divider circuit is connected between the positive output terminal 5a and the ground output terminal 5c. The junction between the resistive elements $R_7$ and $R_8$ is connected to one of the input terminals of the comparator 53. The other input terminal is connected to the reference output potential terminal 5b. The switching operation prohibitive circuit 50 has an output switch 55. The output switch 55 is constructed so that when it is closed, the switching circuit 121 is allowed to closed, as clearly seen from FIG. 1.

In operation, when a current to be detected flows through the a.c. line 11, the secondary current having a intensity determined with a predetermined current transformer ratio is induced to flow in the secondary winding of the current transformer 21.

The secondary current is rectified by the rectifier circuit 30 to become a one-direction current. The output current of the rectifier circuit 30 passes through the power supply circuit 500 and the sensing resistive element 40 and returns to the rectifier circuit 30. At this time, a full wave rectification current corresponding to the load current in the a.c. line 11 flows through the power supply circuit 500 and the sensing resistive element 40.

Figure 3:
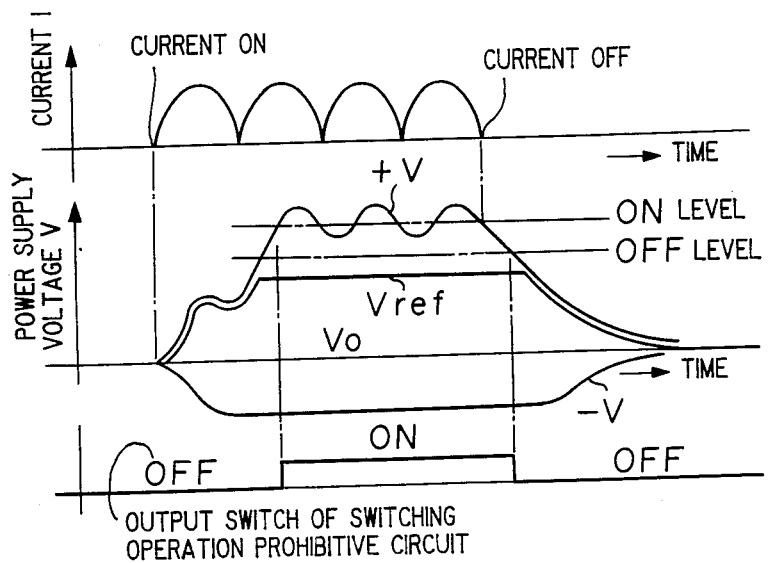
FIG. 3 is an operational illustration of the power supply circuit and the switching operation prohibitive circuit.

When the rectified current flows the power supply circuit 500, the power circuit generates voltages $+V$, $V_{ref}$, $V_0$ and $-V$ at its output terminals 5a, 5b, 5c and 5d. The voltages $+V$, $V_{ref}$ and $-V$ are based on the voltage $V_0$ at the ground output terminal 5c which is grounded, as shown in FIG. 3. The output voltage $+V$ at the output terminal 5a is allowed to include a ripple component. The relation between the output voltage $+V$ and the output voltage $V_{ref}$ is as follows:

$$(+V) > (V_{ref})$$

The output prohibitive of the power supply circuit 500 is applied to the prohibitive circuit 50 which includes the comparator 53 having predetermined hysteresis. When the output voltage +V becomes higher than the ON level as indicated in FIG. 3, the output switch 55 is closed. On the other hand, when the output voltage +V becomes lower than the OFF levels, the output switch 55 is opened.

The difference between the ON level and the OFF level is set to be greater than the ripple component in the output voltage +V, so that the output switch 55 is prevented from being repeatedly closed and opened due to the presence of the ripple component.

In other words, only when the output voltage +V is higher than a prescribed value, the output $V_{ref}$ is stable and the output voltage −V is at a prescribed value, the prohibitive circuit 50 closes the output switch 55.

Power is supplied to the differential amplifier circuit 60 by the power supply circuit 500. The input voltages of the amplifier circuit 60 are fed by the current sensing resistive element 40. The voltage gain A of the amplifier circuit 60 is obtained as follows, as can be seen from FIG. 4:

$$\text{Gain } A = \frac{V \text{ out}}{V \text{ in}} = \frac{R \text{ out}}{R \text{ in}}$$

Figure 5:
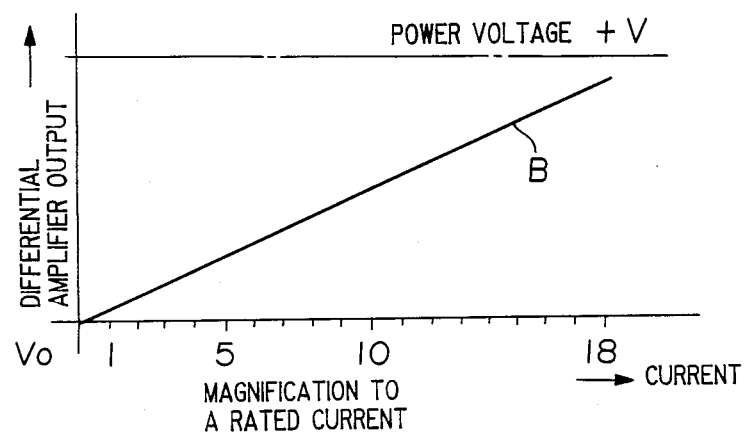
FIG. 5 is a characteristic curve of the differential amplifier.

The output voltage characteristic B as shown in FIG. 5 is obtained.

Figure 4:
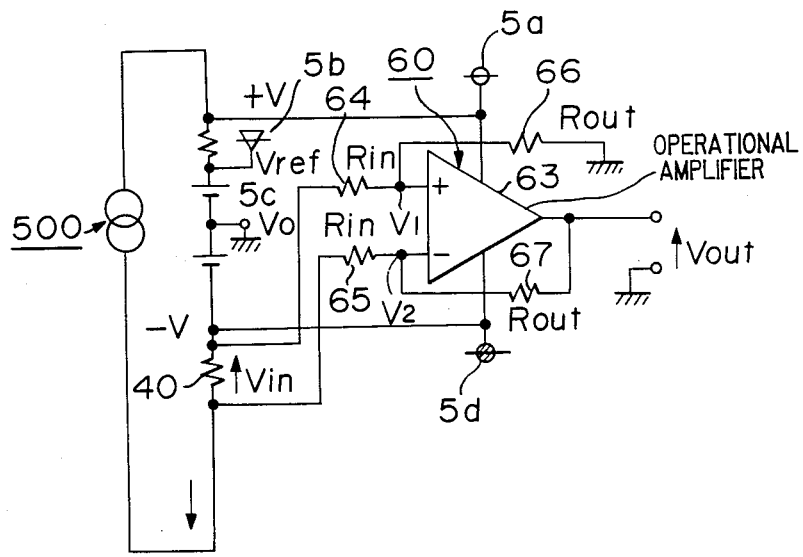
FIG. 4 is equivalent circuits of the power supply circuit and the differential amplifier circuit according to the present invention.
Figure 6:
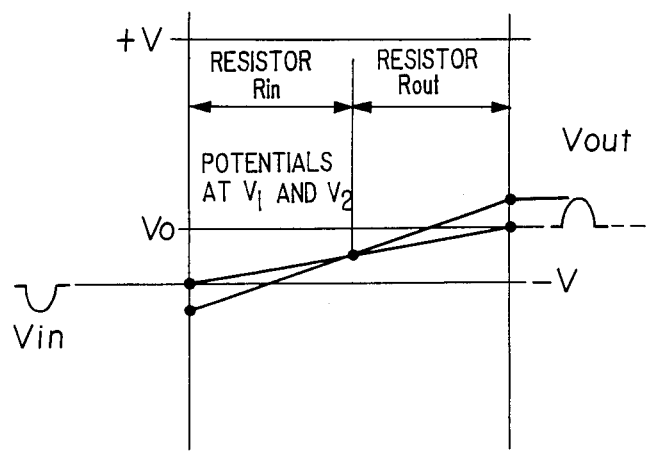
FIG. 6 is an operational illustration of the power supply circuit and the differential amplifier circuit.

In order to properly operate the differential amplifier circuit 60, the following conditions must be satisfied:

The conditions will be explained by use of equivalent circuits of the power supply circuit 500 and the differential amplifier circuit 60 as shown in FIG. 4. In order that the circuit 60 can work as a differential amplifier, the input voltages $V_1$, $V_2$ of the operational amplifier circuit 60 should be at values between the output voltages +V and −V of the power supply circuit 500 (see FIG. 6).

The value of the input resistive element $R_{in}$ and that of the output resistive element $R_{out}$ for the differential amplifier circuit 60 are set to satisfy the conditions as specified above. When the output of the differential amplifier circuit 60 exceeds a predetermined current region, the comparison circuit 70 inputs an output signal.

The output of the comparison circuit 70 is connected to the input of the switching circuit 121 to be able to trigger it through the output switch 55 of the switching operation prohibitive circuit 50 to close the switching circuit 121 so as to make the light emitting element 81 emit light.

There is a case where the current flowing through the a.c. line 11 is as small as 10%–20% of rated current and the output voltage of the power supply circuit 500 is not enough to operate the comparison circuit 70 properly. In order to prevent the comparison circuit 70 from outputting improperly in that case, the output switch 55 of the switching operation prohibitive circuit 50 is opened to prevent the switching circuit 121 from being closed.

Figure 7:
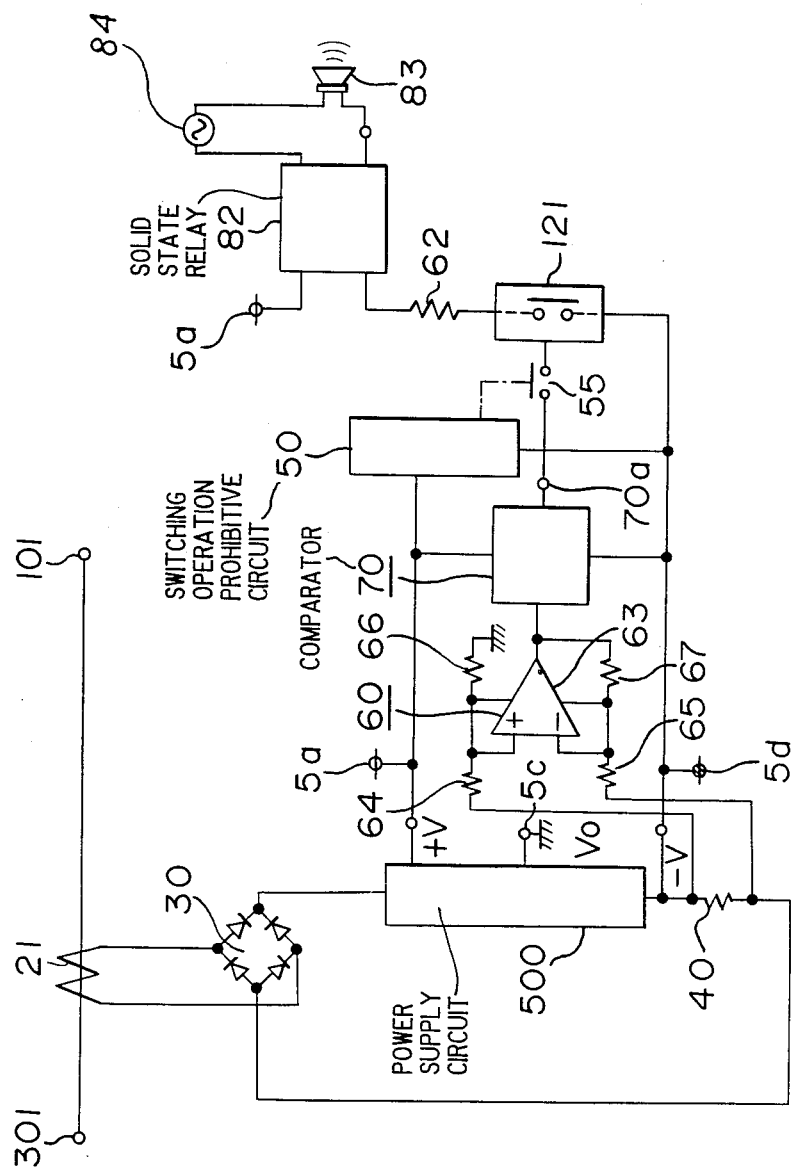
FIG. 7 is a circuit diagram showing another embodiment of the current sensing device.

Another embodiment of the current sensing device according to the present invention will be explained referring to FIG. 7. In the embodiment, a buzzer 83 is used instead of the light emitting element 81. It is driven by another control power source 84. The buzzer is operated through a solid state relay 82 for warning a user. It is desired that the buzzer sounds when the current flowing to the a.c. line 11 is beyond a predetermined level which is approximate to the rated current, for example.

With regard to the embodiments, the explanation on the cases wherein the present invention is applied to the current sensing device for the a.c. line 11 has been made for the sake of clarity. The present invention can be applied to a current sensing device for a d.c. line.

As explained, in accordance with the present invention, the power supply circuit is connected in series with the current sensing resistive element. All the current that flows through the power supply circuit flows the sensing resistive element to prevent an error in detecting the current from being caused. As a result, greater accuracy in the current level detection can be obtained.

In addition, there is provided the switching operation prohibitive circuit. As a result, even when the current flowing through the power supply circuit is too small, the current sensing device can be prevented from malfunctioning.

Now, further embodiment wherein the current sensing device according to the present invention is used in a circuit breaker will be explained.

Figure 8:
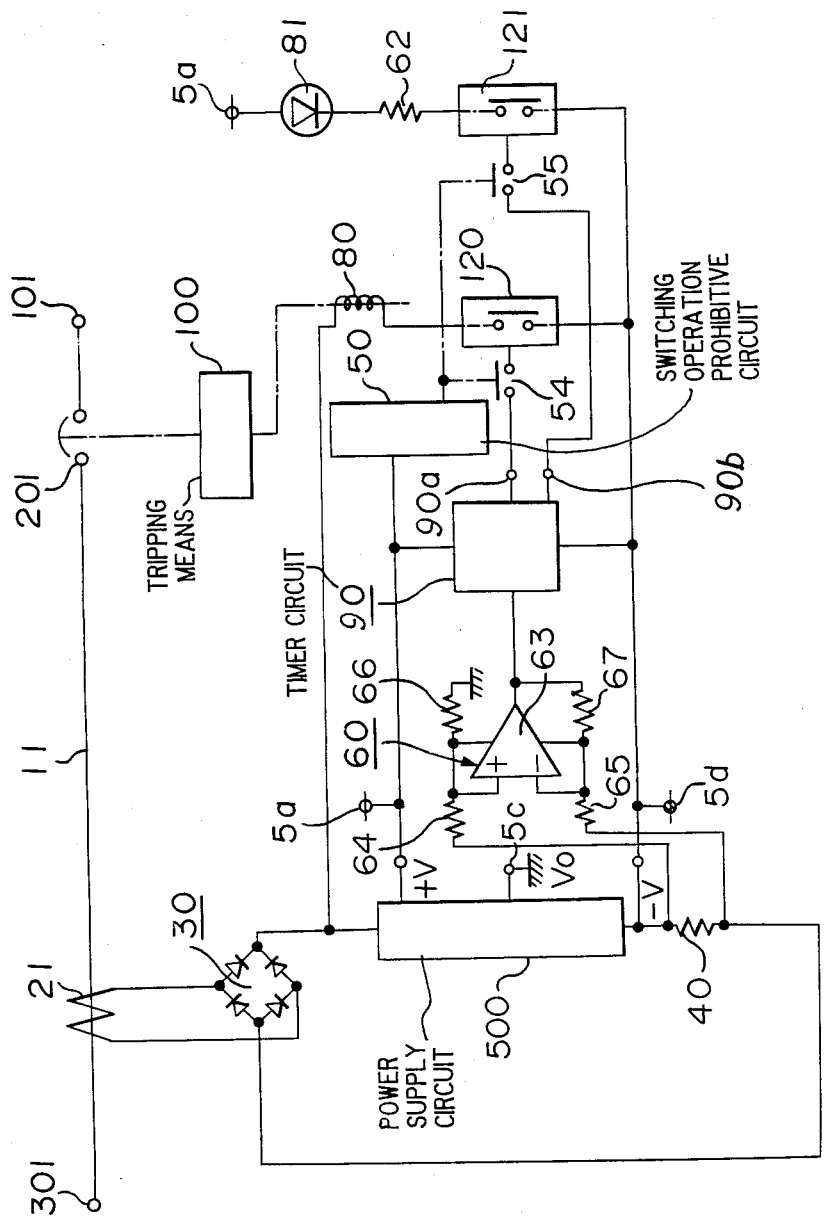
FIG. 8 is a circuit diagram of another embodiment of the current sensing device for a circuit breaker, according to the present invention.

FIG. 8 is the circuit diagram of an embodiment wherein the current sensing device according to the present invention is used in the circuit breaker.

In FIG. 8, the line terminal 101 is connected to a three phase power supply. The line terminal 101 is connected to the load terminal 301 through a tripping contactor for 201.

The control circuit is constituted by a timer circuit 90. The timer circuit 90 includes an instantaneous tripping circuit, a short time delay tripping circuit and a long time delay tripping circuit as known but not shown. The output terminals of the tripping circuits are connected in parallel with one another to constitute the output terminal 90a of the timer circuit 90.

An electromagnetic trip coil 80 has one end connected to the positive output terminal of the rectifier circuit 30. The electromagnetic trip coil 80 has the other end connected in series to one end of a first switching circuit 120. The other end of the switching circuit 120 is connected to the negative terminal 5d of the power supply circuit 500. The electromagnetic trip coil 80 is mechanically interlocked with the tripping contact 201 through tripping means 100 so that the tripping contact 201 is opened when the first switching circuit 120 is closed.

A second switching circuit 121 has one end connected in series to one end of the light emitting element 81 which has the other end connected to the positive output terminal 5a of the power supply circuit 500. The second switching circuit 121 has the other end connected to the negative terminal 5d of the power supply circuit 500. The light emitting element 81 is constituted so that it emits light when the switching circuit 121 is closed.

The switching operation prohibitive circuit 50 has output switches 54 and 55 which are positioned in lines connecting the output terminals 90a, 90b of the timer circuit 70 to the inputs of the first and second switching circuits 120 and 121, respectively. When the output switches 54 and 55 are closed, the first and second switching circuits 120 and 121 are ready for being closed, respectively.

Other constituent elements are indicated by the same reference numerals as used in FIG. 1. Explanation on those elements will be omitted for the sake of the clarity.

Figure 9:
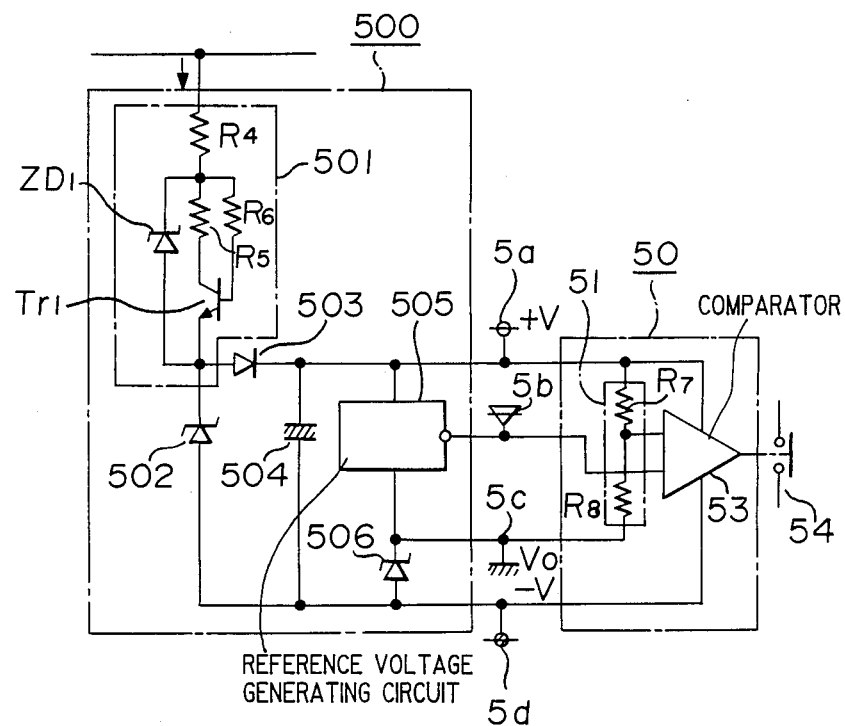
FIG. 9 is a circuit diagram showing an embodiment of the power supply circuit and switching operation prohibitive circuit in the current sensing device as shown in FIG. 8.

FIG. 9 is an embodiment of the power supply circuit 500. In FIG. 9, the power supply circuit is shown to include an impedance circuit 501 which facilitates the operation of the electromagnetic trip coil 80. In the impedance circuit 501, the series combination of a resistive element $R_4$ and a resistive element $R_5$ is connected to the collector of a transistor $T_{r1}$, and the junction between the resistive elements $R_4$ and $R_5$ is connected to the base of the transistor $T_{r1}$ through a resistive element $R_6$. The junction between the resistive elements $R_4$ and $R_5$ is also connected to the emitter of the transistor $T_{r1}$ through a zener diode $ZD_1$.

Connected in series to the impedance circuit 501 is the voltage limiting element 502, such as a zener diode. The diode 503 has the anode connected to the junction between the impedance circuit 501 and the voltage limiting element 502. A smoothing capacitor 504 is connected between the cathode of the diode 503 and the negative terminal 5d of the power supply circuit 500. The cathode of the diode 503 is also connected to the positive terminal 5a of the power supply circuit 500.

Other constituent elements in the power supply circuit are indicated by the same reference numerals as used in FIG. 2. Explanation on those elements are omitted for the sake of clarity.

The operation of the circuit breaker with the current sensing device according to the present invention will be explained.

Figure 10:
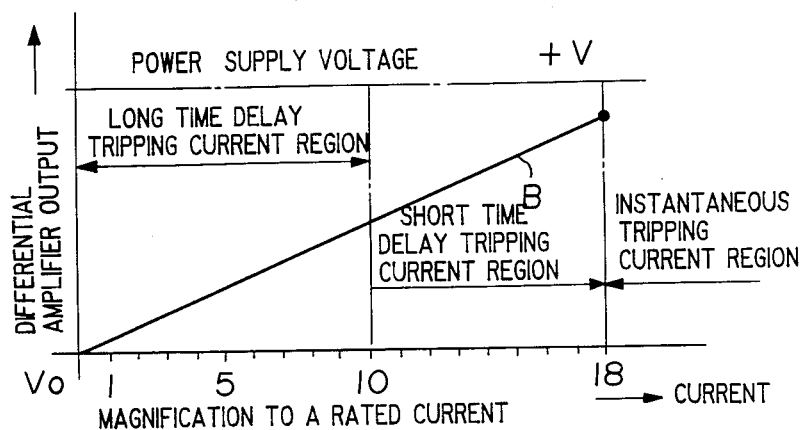
FIG. 10 is a characteristic curve of the differential amplifier in the current sensing device.

When a current flows through the a.c. line 11 like the first embodiment, the differential amplifier 60 produces outputs as shown in FIG. 10.

Figure 11:
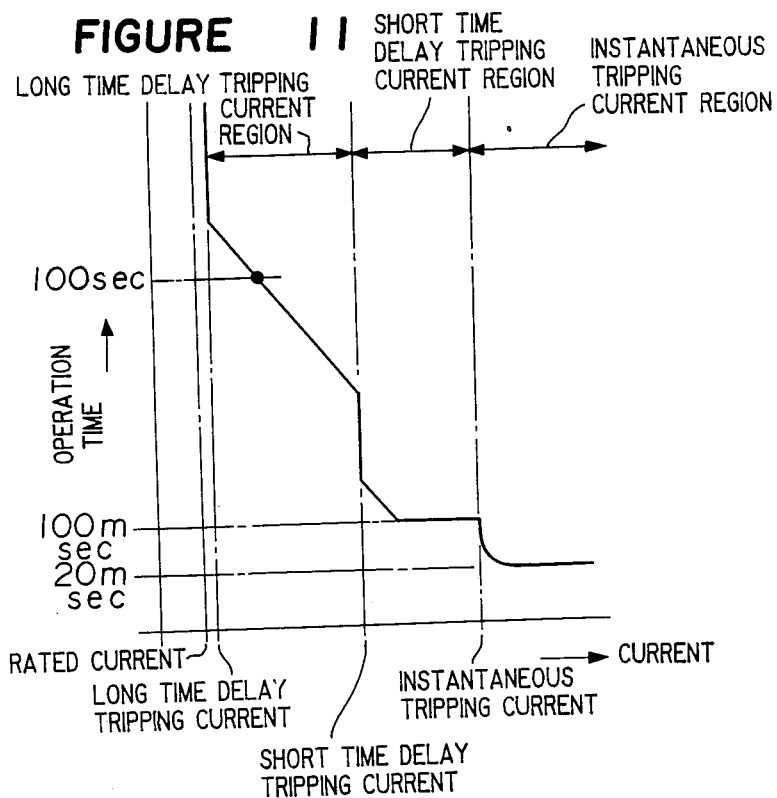
FIG. 11 is an example of the tripping characteristic curve of the circuit breaker using the current sensing device.

The switching operation prohibitive circuit 50 is different from the one of the first embodiment in that it can prohibit the closing operation of both first and second output switches 54 and 55. When the output of the differential amplifier 60 exceeds the instantaneous tripping current region, the short time delay tripping current region or the long time delay tripping current region as shown in FIG. 11, the output terminal 90a of the timer circuit 90 produces the output signals accordingly.

In addition, the timer circuit 90 includes a comparator (not shown) which provides output from the output terminal 90b when the detected current is beyond the predetermined level.

When the output terminals 90a, 90b of the timer circuit 90 triggers the inputs of the switching circuits 120 and 121 through the output switches 54 and 55 of the switching operation prohibitive circuit 50, respectively, the switching circuits are closed to energize the electromagnetic trip device 80. The fact that the load current is beyond the predetermined level is visible by light emission of the light emitting element 81, which is given by the closing of the switching circuit 121. When the electromagnetic trip device 80 is activated, the tripping contact 201 is opened to cut off a fault current. The tripping characteristic curve is shown in FIG. 11.

When the current flowing in the tripping contact 201 is as small as 10%–20% of rated current, the output voltage of the supply circuit 500 is not enough to operate the timer circuit 90 properly. In order to prevent the timer circuit 90 from malfunctioning in that case, the output switches 54 and 55 of the switching operation prohibitive circuit 50 remain opened to avoid the closing of the switching circuits 120 and 121.

Figure 12:
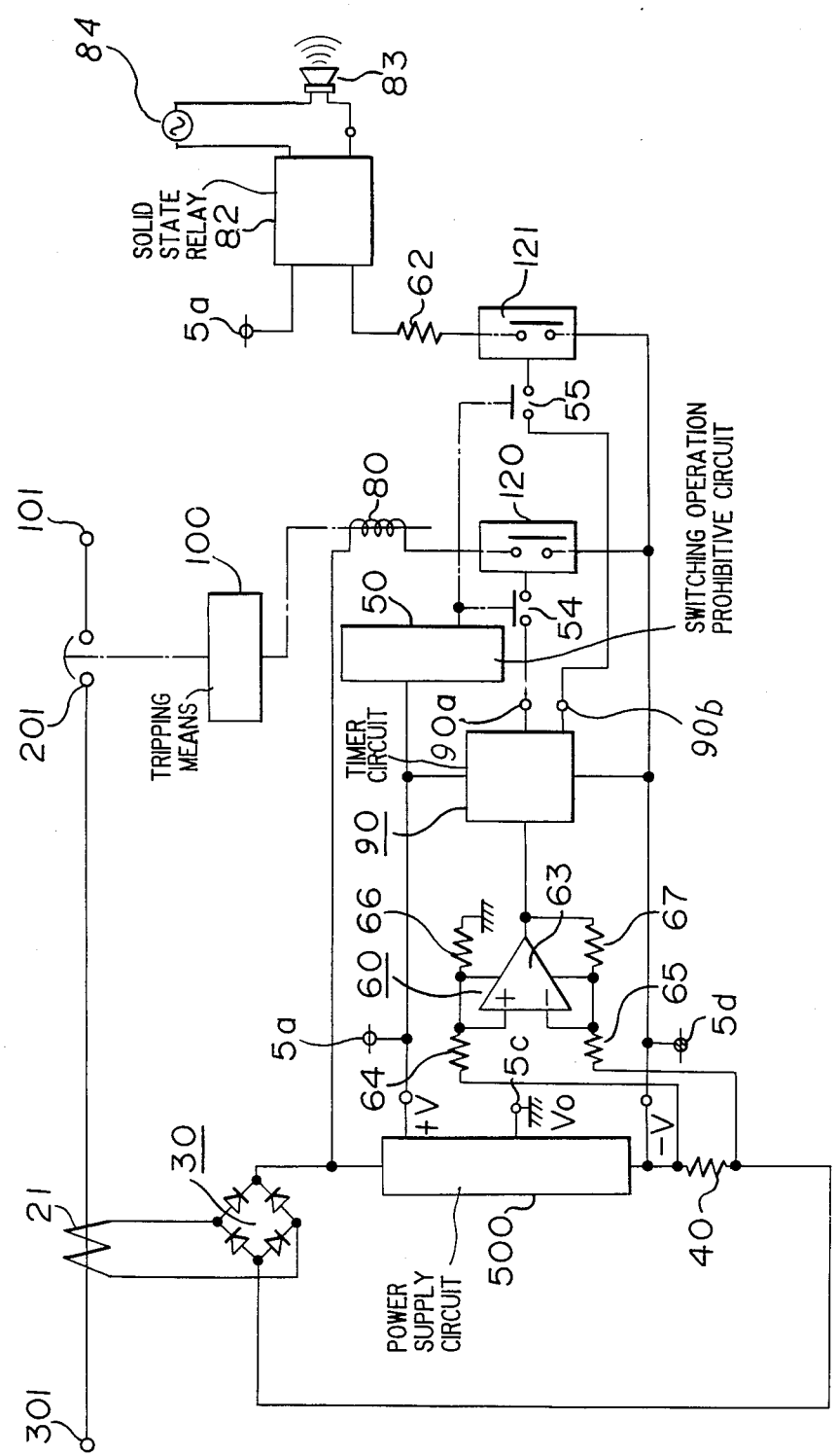
FIG. 12 is a circuit diagram showing another embodiment of the current sensing device for circuit breakers.

Another embodiment wherein the current sensing device according to the present invention is used in the circuit breaker will be explained, referring to FIG. 12. In the embodiment, the buzzer 83 is used instead of the light emitting element 81 like the second embodiment of the current sensing device according to the present invention. The buzzer 83 is operated by the control power source 84 through the solid state relay 82. It is desired that solid state relay is set to sound the buzzer when the current flowing through the tripping contactor 201 is beyond a predetermined value which is approximate to the rated current.

With regard to the third and fourth embodiments, the case wherein the current sensing device according to the present invention is applied to the circuit breaker for cutting off the single-phase a.c. line 11 will be explained for the sake of clarity. The current sensing device according to the present invention is also applicable to circuit breakers for cutting off a multi-phase a.c. line.

As explained, the current sensing device according to the present invention can provide greater accuracy in the tripping characteristics and enhance the safety of the tripping characteristics economically.

I claim:

1. A current sensing device comprising:
    a constant d.c. voltage power supply circuit which is fed with a current flowing in one direction and outputs a positive potential, a ground potential and a negative potential at a positive output terminal, a ground output terminal and a negative output terminal, respectively;
    a current sensing resistive element connected in series to the power circuit;
    a differential amplifier circuit which is fed with power from the output of the power supply circuit, and converts the voltage drop across the current sensing resistive element proportional to the one-directional current into an output signal based on the ground potential between the positive potential and the negative potential of the outputs;
    a switching circuit;
    a control circuit which is fed with power from the power supply circuit and receives the output signal of the differential amplifier circuit proportional to the one-directional current to control the closing operation of the switching circuit;
    signalling means which is activated by the closure of the switching circuit to emit light or produce a warning sound; and
    a switching operation prohibitive circuit which is connected to prevent the switching circuit from being closed improperly when the output voltage of the power supply circuit is not enough to operate the differential amplifier or the control circuit properly.

2. A current sensing device according to claim 1, wherein the control circuit is a comparison circuit which is fed with power from the power supply circuit and compares the output voltage of the differential amplifier circuit proportional to the one-direction current with a reference voltage.

3. A current sensing device according to claim 1, and further comprising;
    a current transformer for detecting the current flowing through an a.c. line, and
    a rectifier circuit which is connected to the secondary winding of the current transformer to convert the secondary a.c. current of the current transformer into a one-direction current, wherein the power supply circuit is connected to between the output terminals of the rectifier circuit.

4. A current sensing device according to claim 3, wherein the control circuit is a timer circuit which is fed with power from the power circuit, is connected to receive the output signal of the differential amplifier circuit proportional to the one-direction current and provide predetermined time delays depending on the magnitude of the one-direction current.

5. In a circuit breaker including a tripping contactor inserted into an a.c. line and a current sensing device for opening the tripping contact, the current sensing device comprising:

a current transformer for detecting a current flowing through the tripping contact;

a rectifier circuit which is connected to the secondary winding of the current transformer to convert the secondary a.c. current of the current transformer into a one-direction current;

a constant d.c. voltage power supply circuit which is connected between the output terminals of the rectifier circuit and outputs a positive potential, a ground potential and a negative potential at a positive output terminal, a ground output terminal and a negative output terminal, respectively;

a current sensing resistive element connected in series to the power supply circuit;

a differential amplifier circuit which is fed with power from the output of the power supply circuit and converts the voltage drop across the current sensing resistive element proportional to the one-directional current into an output signal based on the ground potential between the positive potential and the negative potential of the output of the power supply circuit;

a timer circuit which is fed with power from the power supply circuit, is connected to receive the output signal of the differential amplifier circuit proportional to the one-direction current and provide predetermined time delays depending on the magnitude of the one-direction current;

first and second switching circuits which are closed by the output of the timer circuit;

an electricmagnetic trip coil which is connected in series to the first switching circuit, the series combination of the trip coil and the first switching circuit being connected between the junction of the rectifier circuit and the power supply circuit and the junction of power supply circuit and the current sensing resistive element;

tripping means which is driven by the electromagnetic trip coil energized due to the closure of the first switching circuit, so as to open the tripping contact;

a switching operation prohibitive circuit which is connected to prevent the first and the second switching circuit from being closed when the output voltage of the d.c. voltage supply circuit is not enough to operate the differential amplifier and the timer circuit properly; and signalling means which is driven by the closure of the second switching circuit to emit light or produce a warning sound.

* * * * *